United States Patent
O'Rorke et al.

(10) Patent No.: US 11,713,724 B1
(45) Date of Patent: Aug. 1, 2023

(54) DUAL PUMP FUEL DELIVERY FOR AN AIRCRAFT

(71) Applicant: Hamilton Sundstrand Corporation, Charlotte, NC (US)

(72) Inventors: Morgan O'Rorke, West Hartford, CT (US); Ryan Prescott Susca, Windsor, CT (US); Ryan Shook, Loves Park, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 17/844,872

(22) Filed: Jun. 21, 2022

(51) Int. Cl.
*F02C 9/28* (2006.01)
*F02C 7/236* (2006.01)
*B64D 27/10* (2006.01)
*B64D 37/00* (2006.01)

(52) U.S. Cl.
CPC ............... *F02C 9/28* (2013.01); *B64D 27/10* (2013.01); *B64D 37/005* (2013.01); *F02C 7/236* (2013.01); *F05D 2240/35* (2013.01); *F05D 2270/301* (2013.01); *F05D 2270/80* (2013.01)

(58) Field of Classification Search
CPC ........ B64D 27/10; B64D 37/005; F02C 7/236
See application file for complete search history.

(56) References Cited

U.S. PATENT DOCUMENTS

| | | | |
|---|---|---|---|
| 8,166,765 B2 | 5/2012 | Baker et al. | |
| 8,302,406 B2 | 11/2012 | Baker | |
| 8,523,537 B2 | 9/2013 | Garry | |
| 8,572,974 B2 | 11/2013 | Veilleux | |
| 2002/0176784 A1* | 11/2002 | Du | F04B 1/324 417/213 |
| 2010/0089026 A1* | 4/2010 | Baker | F02C 9/30 137/565.29 |

* cited by examiner

*Primary Examiner* — Scott J Walthour
(74) *Attorney, Agent, or Firm* — Cantor Colburn LLP

(57) ABSTRACT

A dual pump fuel delivery system for an aircraft includes a fixed displacement fuel pump including an inlet and an outlet. The fixed displacement fuel pump is configured to supply a first portion of a fuel demand for the aircraft. A variable displacement fuel pump including an inlet portion and an outlet portion includes a selectively adjustable pump actuator configured to supply a second portion of the fuel demand. The second portion is variable. A fuel demand sensor operates to detect a selected fuel demand. A control member is operatively connected to the fuel demand sensor and the variable displacement fuel pump. The control member being configured to operate to adjust the variable displacement fuel pump to output the second portion of the fuel demand to satisfy the selected fuel demand.

19 Claims, 4 Drawing Sheets

DUAL PUMP FUEL DELIVERY FOR AN AIRCRAFT

BACKGROUND

Exemplary embodiments pertain to the art of aircraft and, more particularly, to a dual pump fuel delivery system for aircraft.

Aircraft typically employ a fixed displacement pump to deliver fuel to combustors. The fixed displacement pump is sized to deliver a fuel flow that satisfies a peak flow demand operating condition such as takeoff. In other than peak flow demand operating conditions, a portion of fuel needed to satisfy demand is passed to the combustor while the remaining portion of the fuel is bypassing the combustors to serve other purposes.

BRIEF DESCRIPTION

Disclosed in accordance with a non-limiting example, is a dual pump fuel delivery system for an aircraft including a fixed displacement fuel pump including an inlet and an outlet. The fixed displacement fuel pump is configured to supply a first portion of a fuel demand for the aircraft. A variable displacement fuel pump including an inlet portion and an outlet portion includes a selectively adjustable pump actuator configured to supply a second portion of the fuel demand. The second portion is variable. A fuel demand sensor operates to detect a selected fuel demand. A control member is operatively connected to the fuel demand sensor and the variable displacement fuel pump. The control member being configured to operate to adjust the variable displacement fuel pump to output the second portion of the fuel demand to satisfy the selected fuel demand.

Additionally, or alternatively, in this or other non-limiting examples, the first seal member includes a pressure regulating valve (PRV) fluidically connected between the fixed displacement fuel pump and the variable displacement fuel pump, the PRV including a bypass outlet configured to deliver a bypass fuel flow from the first portion of the fuel flow and the second portion of the fuel flow to one of the inlet and the inlet portion.

Additionally, or alternatively, in this or other non-limiting examples, the first seal member includes the control member comprises a first control member operatively connected to the PRV and a second control member operatively connected to the pump actuator.

Additionally, or alternatively, in this or other non-limiting examples, the first seal member includes the control member is operatively connected to the PRV.

Additionally, or alternatively, in this or other non-limiting examples, the first seal member includes the bypass outlet of the PRV is operatively connected to the pump actuator.

Additionally, or alternatively, in this or other non-limiting examples, the first seal member includes the control member includes a control input coupled to the outlet and the outlet portion, a first control output connected to the control member and a second control outlet connected to the pump actuator.

Additionally, or alternatively, in this or other non-limiting examples, the first seal member includes the control member comprises an electro-hydraulic servo valve (EHSV).

Also disclosed in accordance with a non-limiting example is an aircraft engine system including a compressor portion including a number of compressor stages, a turbine portion, a combustor fluidically connected to the compressor portion and the turbine portion, and a dual pump fuel delivery system connected to the combustor assembly. The dual pump fuel delivery system includes a fixed displacement fuel pump including an inlet and an outlet. The fixed displacement fuel pump is configured to supply a first portion of a fuel demand for the aircraft. A variable displacement fuel pump including an inlet portion and an outlet portion includes a selectively adjustable pump actuator configured to supply a second portion of the fuel demand. The second portion is variable. A fuel demand sensor operates to detect a selected fuel demand. A control member is operatively connected to the fuel demand sensor and the variable displacement fuel pump. The control member being configured to operate to adjust the variable displacement fuel pump to output the second portion of the fuel demand to satisfy the selected fuel demand.

Additionally, or alternatively, in this or other non-limiting examples, a pressure regulating valve (PRV) fluidically connected between the fixed displacement fuel pump and the variable displacement fuel pump, the PRV including a bypass outlet configured to deliver a bypass fuel flow from the first portion of the fuel flow and the second portion of the fuel flow to one of the inlet and the inlet portion.

Additionally, or alternatively, in this or other non-limiting examples, the control member comprises a first control member operatively connected to the PRV and a second control member operatively connected to the pump actuator.

Additionally, or alternatively, in this or other non-limiting examples, the control member is operatively connected to the PRV.

Additionally, or alternatively, in this or other non-limiting examples, the bypass outlet of the PRV is operatively connected to the pump actuator.

Additionally, or alternatively, in this or other non-limiting examples, the control member includes a control input coupled to the outlet and the outlet portion, a first control output connected to the control member and a second control outlet connected to the pump actuator.

Further disclosed in accordance with a non-limiting example is a method of satisfying fuel demand in an engine of an aircraft including generating a first portion of a fuel flow in a first pump of a fuel system, generating a second portion of the fuel flow in a second pump of the fuel system, determining a fuel flow demand for the engine, sensing a combined fuel pressure of the first portion of the fuel flow and the second portion of the fuel flow, and adjusting the second portion of the fuel flow to meet the fuel flow demand.

Additionally, or alternatively, in this or other non-limiting examples adjusting the second portion of the fuel flow includes controlling a pump actuator of the second pump.

Additionally, or alternatively, in this or other non-limiting examples, controlling the pump actuator includes adjusting an output of an electro-hydraulic servo valve (EHSV) connected to the pump actuator.

Additionally, or alternatively, in this or other non-limiting examples, controlling the pump actuator includes adjusting a bypass outlet of a pressure regulating valve (PRV).

Additionally, or alternatively, in this or other non-limiting examples, adjusting the bypass outlet includes adjusting a position of the PRV with an EHSV.

Additionally, or alternatively, in this or other non-limiting examples, the method also includes creating a bypass flow from the first portion of the fuel flow and the second portion of the fuel flow by adjusting a pressure regulating valve with a first output of a flow controller and adjusting the second portion of the fuel flow by controlling the pump actuator of the second pump with a second output of the flow controller.

Additionally, or alternatively, in this or other non-limiting examples, generating the first portion of the fuel flow includes creating a steady state flow demand with the first pump.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
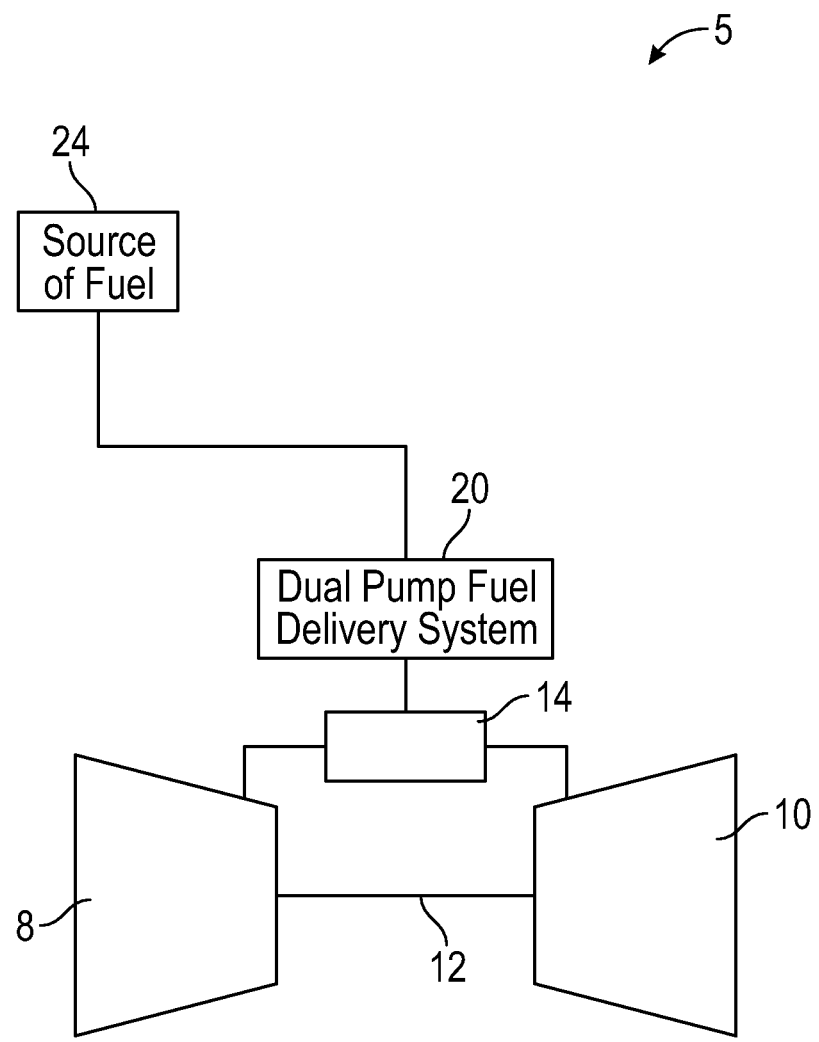
FIG. 1 is a schematic depiction of an engine for an aircraft including a dual pump fuel delivery system, in accordance with a non-limiting example.

An air-breathing aircraft engine system is indicated generally at 5 in FIG. 1. Air-breathing aircraft engine system 5 includes a compressor portion 8 operatively coupled to a turbine portion 10 through a shaft 12. A combustor assembly 14 is fluidically connected between compressor portion 8 and turbine portion 10. A dual pump fuel delivery system 20 fluidically connects combustor assembly 14 with a source of fuel 24. Dual pump fuel delivery system 20 may receive fuel directly from source of fuel 24 or, through a compressor stage (not shown) that creates an input pressure for the fuel.

Figure 2:
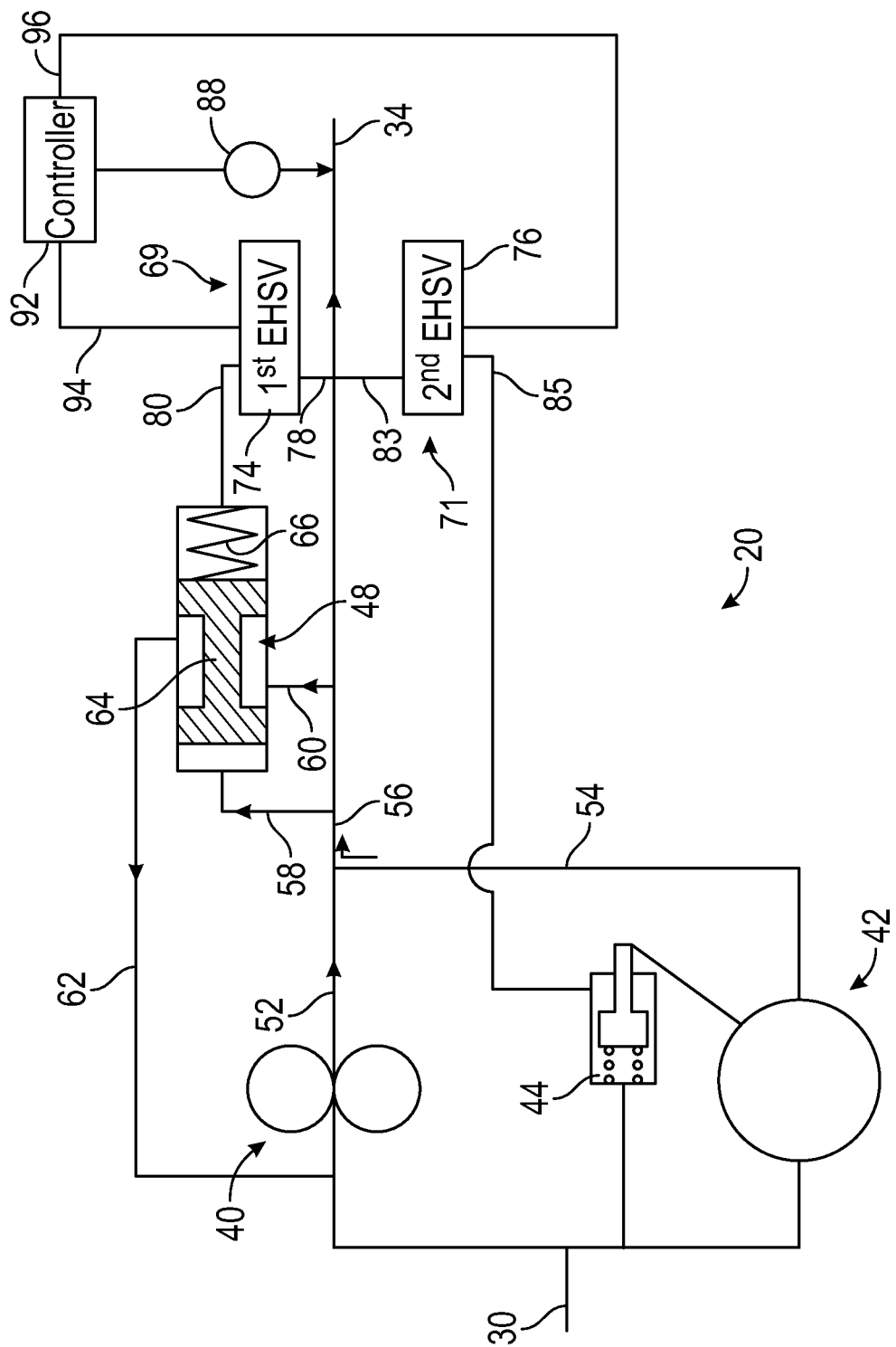
FIG. 2 is a schematic depiction of a dual pump fuel delivery system, in accordance with a non-limiting example.

Reference will now follow to FIG. 2 in describing dual pump fuel delivery system 20 in accordance with a non-limiting example. Dual pump fuel delivery system 20 includes an inlet 30 fluidically coupled to source of fuel 24 and an outlet 34 fluidically coupled to combustor assembly 14. Inlet 30 is connected to a first or fixed displacement pump 40 and a second or variable displacement pump 42 having a pump actuator 44. In a non-limiting example, fixed displacement pump 40 is sized to provide fuel to combustor assembly 14 during a steady-state or cruise mode of operation. During transitionary phases of flight such as take-off, landing, or altitude changes, variable displacement pump 42 is employed to meet an increased fuel demand.

In a non-limiting example, dual pump fuel delivery system 20 includes a pressure regulating valve (PRV) 48 coupled to fixed displacement pump 40 through a first outlet line 52 and to variable displacement pump 42 through a second outlet line 54. Fuel flow from fixed displacement pump 40 in first outlet line 52 and fuel flow from variable displacement pump 42 combine in combined fuel flow line 56. The combined fuel flows into PRV 48 through an actuator line 58 and a bypass inlet 60. Flow flows from bypass inlet 60 through PRV 48, to a bypass outlet 62 where it is returned to inlet 30. Fuel entering actuator line 58 acts on a spool 64 in PRV 48 against a spring 66 to adjust an amount of bypass flow passing through PRV 48 as will be detailed more fully herein.

In a non-limiting example, dual pump fuel delivery system 20 includes a first control member 69 connected between combined fuel flow line 56 and PRV 48 and a second control member 71 connected between combined fuel flow line 56 and pump actuator 44. In a non-limiting example, first control member 69 may take the form of a first electro-hydraulic servo valve (EHSV) 74 and second control member 71 may take the form of a second electro-hydraulic servo valve (EHSV) 76.

In a non-limiting example, first EHSV 74 includes a first control input 78 connected to combined fuel flow line 56 and a first control output 80 connected to PRV 48. Second EHSV 76 includes a second control input 83 connected to combined fuel flow line 56 and a second control output 85 connected to pump actuator 44. As will be detailed more fully herein, first EHSV 74 delivers a control pressure to PRV 48 that cooperates with actuation pressure in actuator line 58 to establish a selected amount of bypass flow through spool 64. Second EHSV 76 delivers actuation pressure to pump actuator 44 to establish a selected fuel output from variable displacement pump 42.

In a non-limiting example, a fuel demand sensor 88 is connected to combined fuel flow line 56. Fuel demand sensor 88 detects an amount of fuel pressure in combined fuel flow line 56. A controller 92 is operatively connected to fuel demand sensor 88. Controller 92 determines an amount of fuel demand for air-breathing aircraft engine 5 system, and signals first EHSV 74 through a first control output 94 and second EHSV 76 through a second control output 96 to control PRV 48 and pump actuator 44 respectively to deliver a selected fuel pressure to meet the fuel demand.

In a non-limiting example, during steady-state flight operations, fixed displacement pump 40 delivers fuel to combustor assembly 14. Controller 92 signals second EHSV 76 to control variable displacement pump 42 to produce minimal fuel flow. First EHSV 74 shifts spool 64 so as to establish a selected amount of bypass flow. The selected amount of bypass flow may be equal to the minimum fuel flow from variable displacement pump 42. During other stages of flight, such as take-off, landing, or altitude changes, controller 92 may signal second EHSV 76 to produce additional fuel to meet an increasing demand.

Controller 92 tracks fuel pressure through fuel demand sensor 88 and signals second EHSV 76 to adjust pump actuator 44 to meet the demand. First EHSV 74 controls PRV 48 to reduce over supply by adjusting bypass flow. In this manner, dual pump fuel delivery system 20 establishes a thrust specific fuel consumption amount that more closely matches actual fuel demand.

Figure 3:
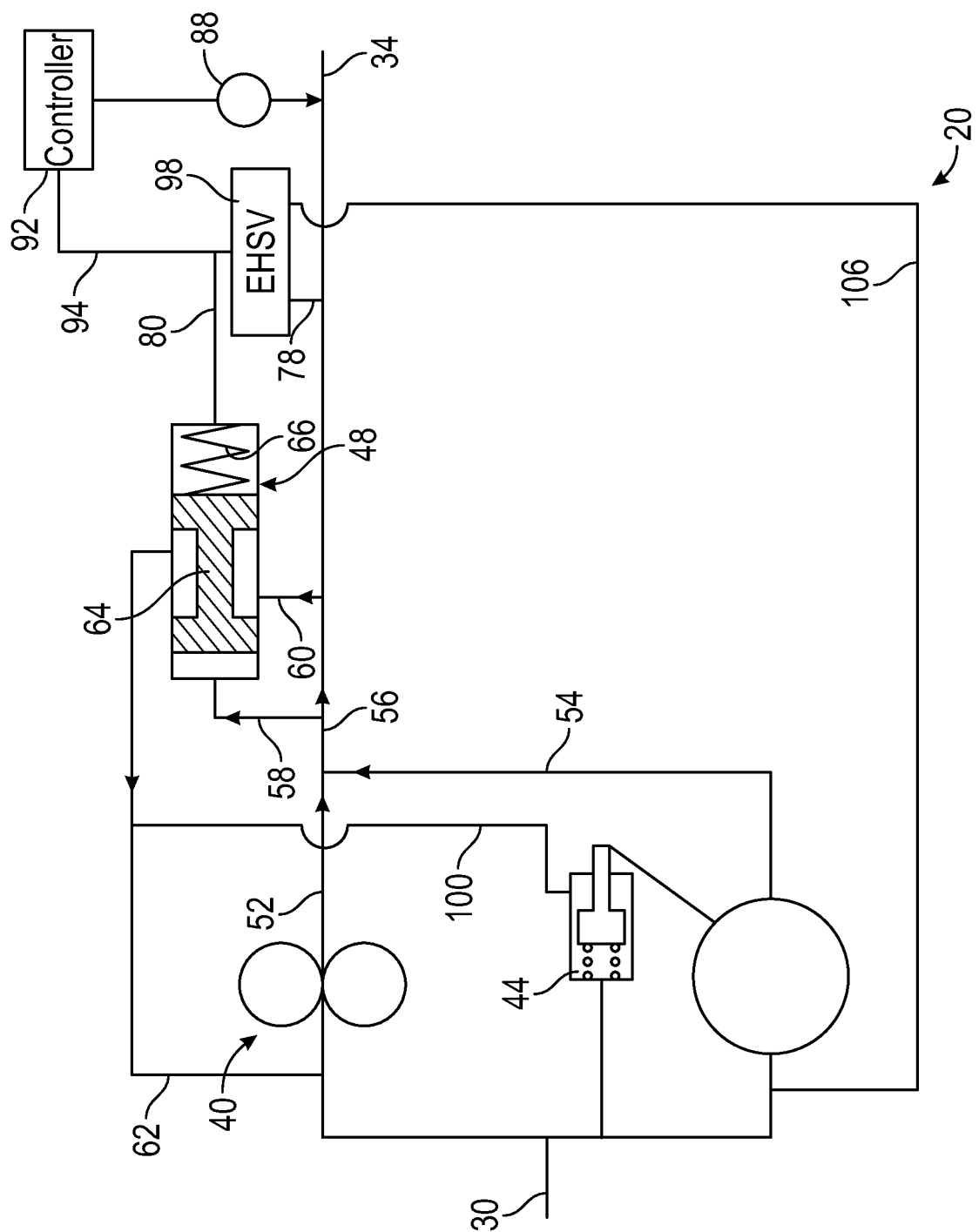
FIG. 3 is a schematic depiction of a dual pump fuel delivery system, in accordance with another non-limiting example.

FIG. 3, in which like reference numbers represent corresponding parts in the respective views, depicts dual pump fuel delivery system 20 in accordance with another non-limiting example. Instead of multiple control members, a single EHSV 98 controls both PRV 48 and pump actuator 44. In a non-limiting example, EHSV 98 receives signals from controller 92 to adjust a position of spool 64 to meet fuel demand. In steady-state conditions, controller 92 reduces bypass flow through PRV 48. Bypass flow pressure passes through a pump actuator control line 100 to pump actuator 44.

Reduced bypass flow pressure through pump actuator control line 100 as established by controller 92 causes pump actuator 44 to reduce output from variable displacement pump 42. As fuel demand increases and controller 92 increases bypass flow, pressure through pump actuator control line 100 increases to signal variable displacement pump 42 to produce additional flow. In a non-limiting example, control flow passing through EHSV 98 may be returned to inlet 30 through a control bypass flow line 106.

Figure 4:
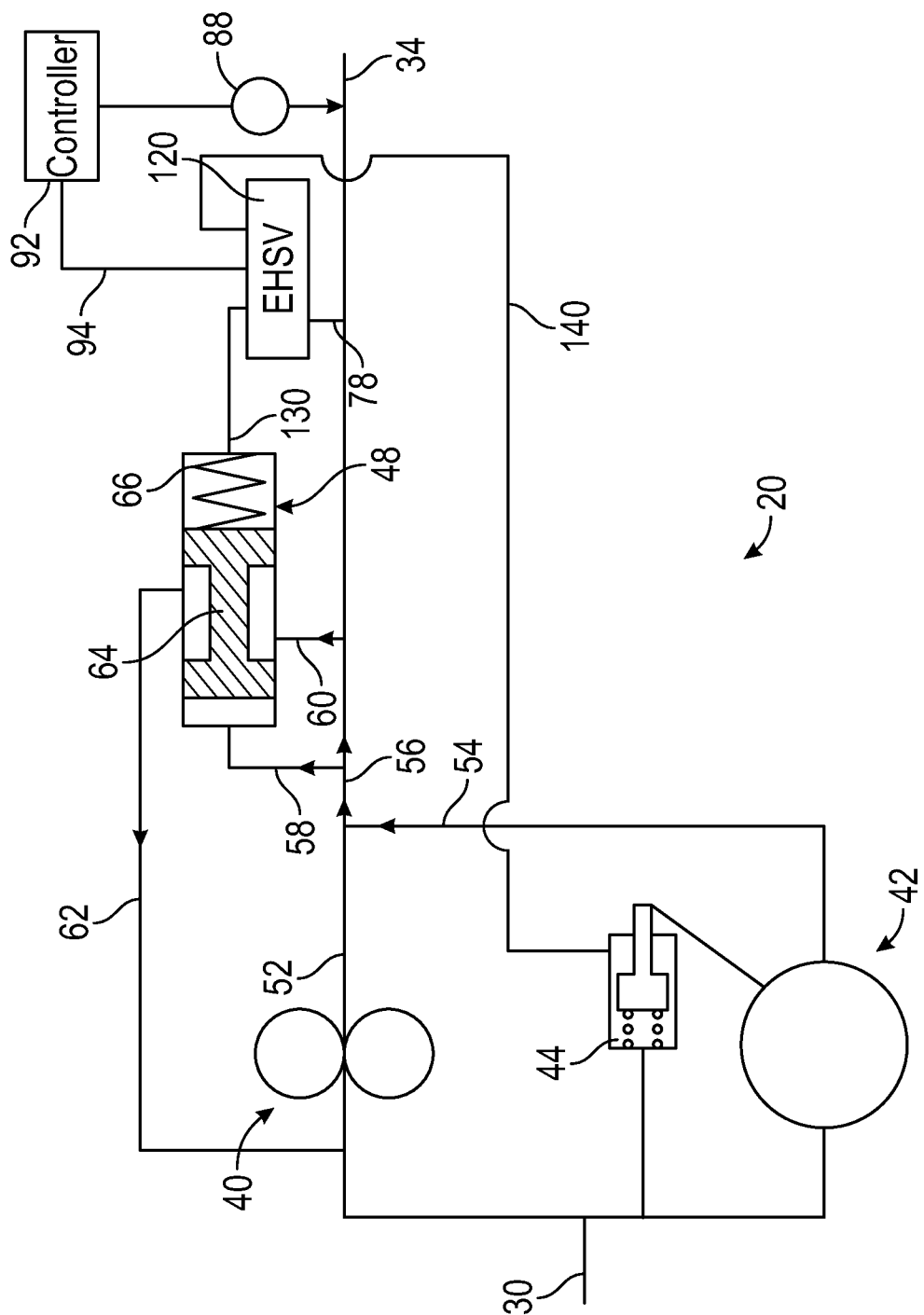
FIG. 4 is a schematic depiction of a dual pump fuel delivery system, in accordance with yet another non-limiting example.

FIG. 4, in which like reference numbers represent corresponding parts in the respective views, depicts dual pump fuel delivery system 20 in accordance with another non-limiting example. In the non-limiting example shown, a single EHSV 120 is connected to PRV 48 and pump actuator 44. EHSV 120 includes first control input 78, a first control output 130 connected to PRV 48 and a second control output 140 connected to pump actuator 44. As fuel demand changes, controller 92 signals EHSV 120 to produce additional fuel pressure by reducing bypass flow and increasing output from variable displacement pump 42 or less fuel pressure by increasing bypass flow and reducing output from variable displacement pump 42. In each of the non-limiting examples described herein, dual pump fuel delivery system 20 establishes a thrust specific fuel consumption amount that more closely matches actual fuel demand.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method of satisfying fuel demand in an engine system of an aircraft, the engine system comprising a dual pump fuel delivery system comprising a fixed displacement fuel pump including an inlet and an outlet, the fixed displacement fuel pump being configured to supply a first portion of fuel for the aircraft, a variable displacement fuel pump including an inlet portion and an outlet portion, the variable displacement fuel pump including a selectively adjustable pump actuator configured to supply a second portion of fuel for the aircraft, the second portion being variable, the dual pump fuel delivery system further comprising a fuel demand sensor operable to detect a selected fuel demand, a control member operatively connected to the fuel demand sensor and the variable displacement fuel pump, the control member being configured to operate to adjust the variable displacement fuel pump to output the second portion of fuel to satisfy the selected fuel demand, and an outlet line configured to deliver fuel from the duel pump fuel delivery system to an engine, wherein the control member comprises a control input connected to the outlet line, the method comprising:
    generating the first portion of fuel in the fixed displacement fuel pump;
    generating the second portion of fuel in the variable displacement fuel pump;
    determining the selected fuel flow demand for the engine;
    sensing a combined fuel pressure of the first portion of fuel and the second portion of fuel; and
    adjusting the second portion of fuel to meet the selected fuel flow demand.

2. The method of claim 1, wherein adjusting the second portion of fuel includes controlling the selectively adjustable pump actuator of the variable displacement fuel pump.

3. The method of claim 2, wherein controlling the selectively adjustable pump actuator includes adjusting an output of the control member connected to the selectively adjustable pump actuator.

4. The method of claim 2, wherein controlling the selectively adjustable pump actuator includes adjusting a bypass outlet of a pressure regulating valve (PRV).

5. The method of claim 4, wherein adjusting the bypass outlet includes adjusting a position of the PRV with the control member.

6. The method of claim 2, further comprising: creating a bypass flow from the first portion of fuel and the second portion of fuel by adjusting a pressure regulating valve with a first output of the control member; and adjusting the second portion of fuel by controlling the selectively adjustable pump actuator of the variable displacement fuel pump with a second output of the control member.

7. The method of claim 1, wherein generating the first portion of fuel includes creating a steady state flow with the first pump.

8. A dual pump fuel delivery system for an aircraft comprising:
    a fixed displacement fuel pump including an inlet and an outlet, the fixed displacement fuel pump being configured to supply a first portion of a fuel demand for the aircraft;
    a variable displacement fuel pump including an inlet portion and an outlet portion, the variable displacement fuel pump including a selectively adjustable pump actuator configured to supply a second portion of the fuel demand, the second portion being variable;
    a fuel demand sensor operable to detect a selected fuel demand;
    a control member operatively connected to the fuel demand sensor and the variable displacement fuel pump, the control member being configured to operate to adjust the variable displacement fuel pump to output the second portion of the fuel demand to satisfy the selected fuel demand; and
    an outlet line configured to deliver fuel from the duel pump fuel delivery system to an engine,
    wherein the control member comprises a control input connected to the outlet line.

9. The dual pump fuel delivery system according to claim 8, further comprising: a pressure regulating valve (PRV) fluidically connected between the fixed displacement fuel pump and the variable displacement fuel pump, the PRV including a bypass outlet configured to deliver a bypass fuel flow from the first portion of the fuel flow and the second portion of the fuel flow to one of the inlet and the inlet portion.

10. The dual pump fuel delivery system according to claim 9, wherein the control member comprises a first control member operatively connected to the PRV and a second control member operatively connected to the selectively adjustable pump actuator.

11. The dual pump fuel delivery system according to claim 9, wherein the control member is operatively connected to the PRV.

12. The dual pump fuel delivery system according to claim 11, wherein the bypass outlet of the PRV is operatively connected to the selectively adjustable pump actuator.

13. The dual pump fuel delivery system according to claim 9, wherein the control input is coupled to the outlet and the outlet portion via the outlet line, a first control output is connected to the control member and a second control outlet is connected to the selectively adjustable pump actuator.

14. An aircraft engine system for an aircraft comprising:
a compressor portion;
a turbine portion;
a combustor fluidically connected to the compressor portion and the turbine portion; and
a dual pump fuel delivery system operatively connected to the combustor, the dual pump fuel delivery system comprising:
   a fixed displacement fuel pump including an inlet connected to an inlet of the duel pump fuel delivery system and an outlet connected to the combustor, the fixed displacement fuel pump being configured to supply a first portion of a fuel demand for the aircraft;
   a variable displacement fuel pump including an inlet portion connected to the inlet of the duel pump fuel delivery system and an outlet portion connected to the combustor, the variable displacement fuel pump including a selectively adjustable pump actuator configured to supply a second portion of the fuel demand, the second portion being variable;
a fuel demand sensor operable to detect a selected fuel demand;
a control member operatively connected to the fuel demand sensor and the variable displacement fuel pump, the control member being configured to operate to adjust the variable displacement fuel pump to output the second portion of the fuel demand to satisfy the selected fuel demand; and
an outlet line configured to receive fuel from the outlet and the outlet portion and deliver the fuel from the duel pump fuel delivery system to the combustor,
wherein the control member comprises a control input connected to the outlet line.

15. The aircraft engine system according to claim 14, further comprising: a pressure regulating valve (PRV) fluidically connected between the fixed displacement fuel pump and the variable displacement fuel pump, the PRV including a bypass outlet configured to deliver a bypass fuel flow from the first portion of the fuel flow and the second portion of the fuel flow to one of the inlet and the inlet portion.

16. The aircraft engine system according to claim 15, wherein the control member comprises a first control member operatively connected to the PRV and a second control member operatively connected to the selectively adjustable pump actuator.

17. The aircraft engine system according to claim 15, wherein the control member is operatively connected to the PRV.

18. The aircraft engine system according to claim 15, wherein the control member includes a first control output connected to the control member and a second control outlet connected to the selectively adjustable pump actuator.

19. The aircraft engine system according to claim 17, wherein the bypass outlet of the PRV is operatively connected to the selectively adjustable pump actuator.

* * * * *